DE FOREST L. GATES.
AUTOMOBILE TIRE.
APPLICATION FILED FEB. 3, 1910.
1,007,778.
Patented Nov. 7, 1911.
2 SHEETS—SHEET 1.
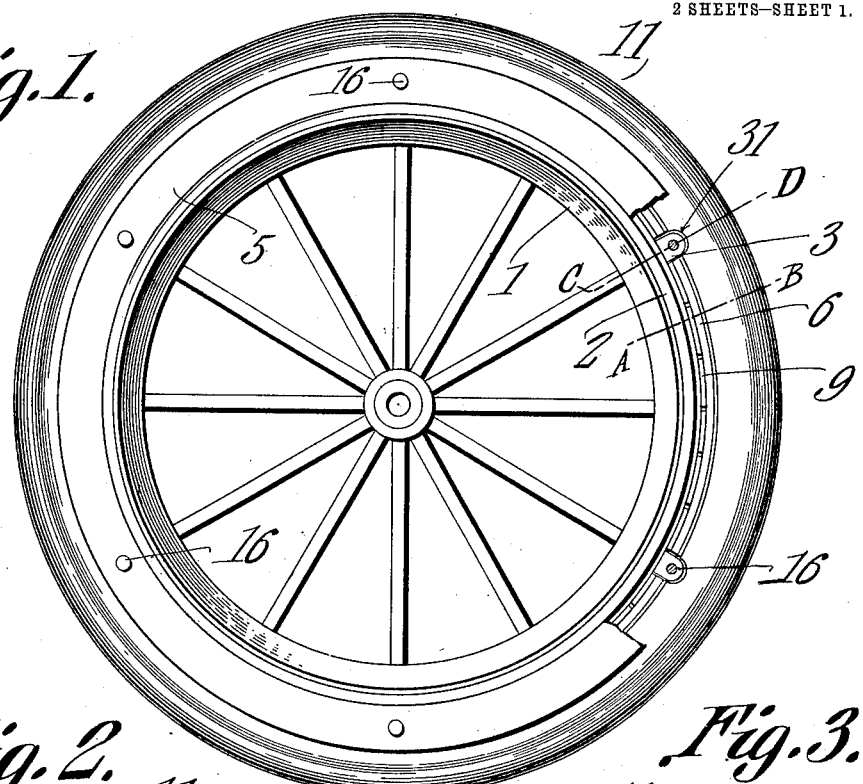
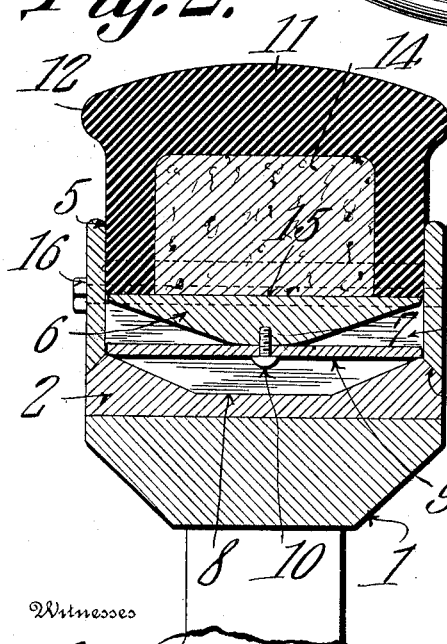
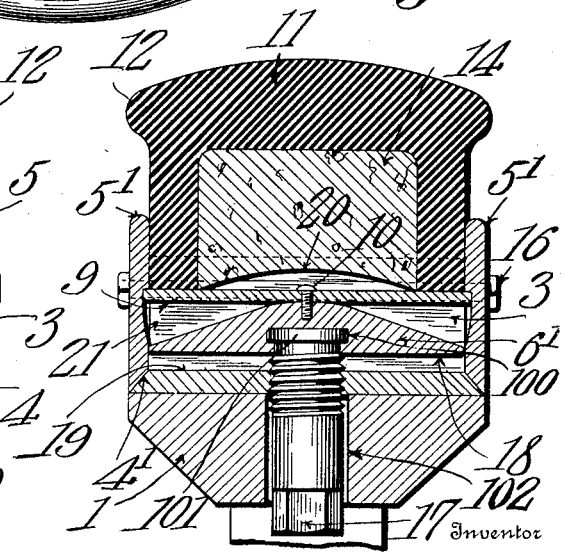
Witnesses
Inventor
De Forest L. Gates.
By C. A. Snow & Co.
Attorneys

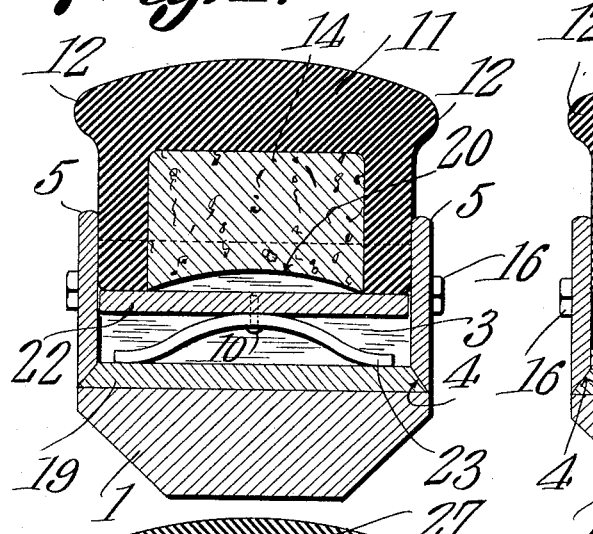
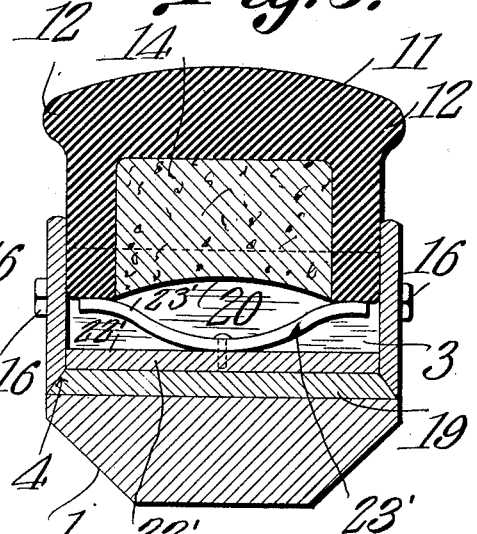
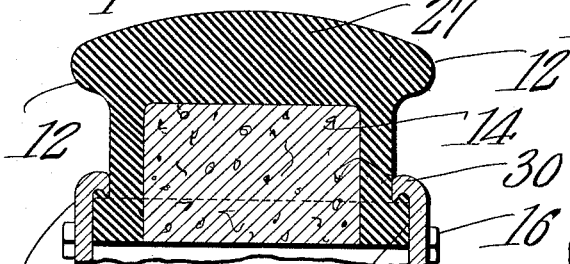
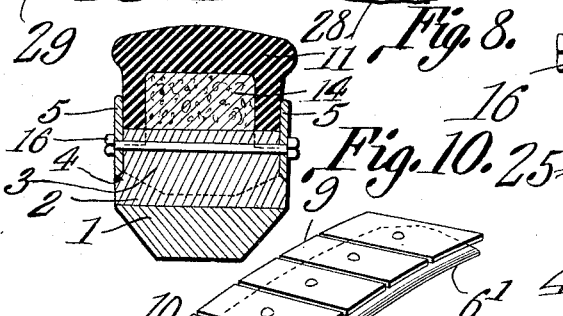
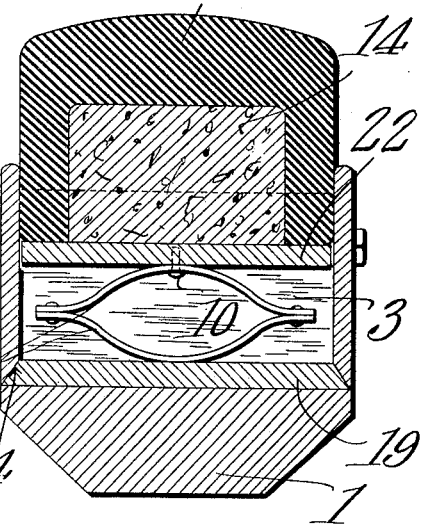
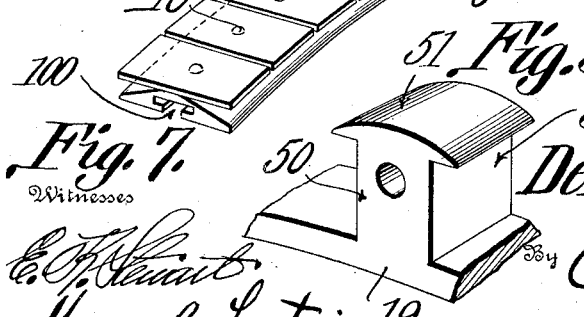

UNITED STATES PATENT OFFICE.

DE FOREST L. GATES, OF SALAMANCA, NEW YORK.

AUTOMOBILE-TIRE.

1,007,778. Specification of Letters Patent. Patented Nov. 7, 1911.

Application filed February 3, 1910. Serial No. 541,667.

*To all whom it may concern:*

Be it known that I, DE FOREST L. GATES, a citizen of the United States, residing at Salamanca, in the county of Cattaraugus and State of New York, have invented a new and useful Automobile-Tire, of which the following is a specification.

It is the object of this invention to provide a tire structure, so constructed that the same will not creep around the circumference of the wheel.

Another object of the invention is to provide a spring structure of novel and improved form, adapted to be interposed between the tire and the rim of the wheel, to support the tire yieldingly.

Another object of the invention is to provide means for housing and inclosing the spring structure, and to provide means for holding the housing means in place upon the wheel.

Another object of the invention is to provide a means for adjusting the resilient structure whereby the tire is yieldingly supported.

With the above and other objects in view, the invention consists in the novel construction and arrangement of parts hereinafter described, delineated in the drawings, and specifically claimed, it being understood that changes, properly falling within the scope of what is claimed, may be made, without departing from the spirit of the invention.

Similar numerals of reference are employed to denote corresponding parts throughout the several figures of the drawings.

In the accompanying drawings, Figure 1 is a side elevation of a wheel, equipped with the device of my invention, parts being broken away that the internal structure of the device may more clearly appear; Fig. 2 is a transverse section upon the line A—B of Fig. 1 showing one form of the invention; Fig. 3 is a transverse section showing a modified form thereof; Fig. 4 is a transverse section showing a still further modification; Fig. 5 is a transverse section showing another form of the device; Fig. 6 is a transverse section of a further modification; Fig. 7 is a perspective of one of the spring-carrying plates; Fig. 8 is a transverse section showing the manner in which any of the preceding devices may be adapted for use as a clencher tire; Fig. 9 is a perspective of a modified form of lug. Fig. 10 is a transverse section upon the line C—D of Fig. 1.

In the accompanying drawings, the felly of a wheel is shown, and denoted by the numeral 1. Inclosing this felly 1, is a band 2, preferably fashioned from steel, and provided with outstanding lugs 3, spaced apart circumferentially of the wheel. There may be any desired number of these lugs 3; I have found six of them to be sufficient for all practical purposes. The lateral edges of the band 2 are beveled as shown at 4, and upon these beveled edges, rest annular plates 5, beveled to correspond with the bevel of the band. There are transverse openings in the lugs 3 and in the side plates 5 and through these openings extend bolts 16, or other common fastening means adapted to like ends, whereby the annular plates 5 may be secured in place upon the wheel.

Located between the annular plates 5, are bearing strips 6, the bearing strips being adapted to fit between the lugs 3, the lugs 3 thus preventing the bearing strips from having movement circumferentially of the band. As shown in Fig. 2 of the drawings, each of the bearing strips 6 is thickened along its longitudinal center, to form a rib 7, while the upper face of the band 2 is cut-away to form a longitudinally extended channel 8. A plurality of spring plates 9 are secured by means of rivets 10 or the like, to the rib 7 of the bearing strip 6; there may be six or eight of these spring plates, to each one of the bearing strips 6. The spring plates 9 rest at their ends, upon the edges of the band 2 the channel 8 in the band permitting the spring plates 9 to yield downwardly.

The wheel is inclosed by a tire 11, and this tire rests, between the annular plates 5, upon the bearing plates 6. There are spaced openings 31 in the lower face of the tire 11, and these openings, engaging the lugs 3, prevent the tire from having movement circumferentially of the wheel. This tire 11 is a trough like structure, the side walls of which rest, at their lower edges, upon the bearing strips 6. Adjacent the tread of the tire, the same may be provided upon its lateral edges, with outstanding ribs 12, whereby the tread of the tire may be increased. Within the tire 11 there is a filling 14, the lower surface of which may, as denoted by the numeral 15, be fashioned perfectly flat, to rest upon the flat upper faces of the bearing strips 6. The tire proper 11 is preferably fashioned from rubber; the filling 14 may be of any chosen material.

In Fig. 3 of the drawings, wherein a slight modification is shown, it will be seen that the bearing strip is inverted as shown at 6', so that its flat side is downwardly disposed, the spring plates 9 being brought into direct contact with the tire 11. Spaced screws 17 may be extended through felly 1 and through the band 19, which, in the present instance is a flat structure, instead of a concaved one, and beveled as shown at 4', in Fig. 3. In the lower face of the strip 6' there is a slot 100, extended through the end faces of the strip and enlarged within the contour of the strip (see Fig. 7). The screws 17 are provided with enlarged heads 101. The heads 101 are slipped into the ends of the slot 100, and the screws are then placed in the openings 102 in the felly. These screws 17, engaging the bearing strips, may be employed to retract the bearing strips and the spring plates 9, toward the felly of the wheel, in order that the tire 11 may be mounted in place. Subsequently, the screws 17 are manipulated to advance the strips and the spring plates 9 into bearing with the tire 11, thus holding the same securely in place.

In the form of the invention shown in Fig. 2, and in the forms following Fig. 3, the springs may be held under compression during the mounting of the tire, by any suitable clamping devices adapted to that end.

In the form delineated in Fig. 3, the lower face of the filling 14 is upwardly concaved, as denoted by the numeral 20, and in the adjacent side faces of the plates 5', there are notches 21, adapted to receive the ends of the springs 9, to limit them against outward movement.

In the form shown in Fig. 4, the bearing plate 22 is a flat structure, disposed in direct contact with the tire 11. In this form of the invention, the springs 23 are arcuate in form, and are secured in their intermediate portions to the bearing plates 22, intermediate of the edges thereof; the free, depending ends of the springs 23 bearing against the band 19 which surrounds the felly 1 of the wheel.

In the form shown in Fig. 5, the plate 22' and the springs 23' which are connected thereto, have been inverted bodily, so that the springs 23' instead of the plate 22', bear directly against the tire 11. If desired, the springs may take the double convex form denoted by the numeral 25 in Fig. 6, and the tire 26 may be fashioned without the outstanding ribs 12.

Obviously, all of the forms of the invention hereinbefore described may be adapted for use in the clencher construction so called. A clencher tire 27 is shown in Fig. 8 of the drawings. The sides of the tire 27 are provided with outstanding ribs 28, and the edges of the side plates 29 are bent inwardly, as denoted by the numeral 30, so that they may engage the ribs 28 upon the tire, in the well known manner. In any of the forms of the invention hereinbefore described, it will be seen that the commonly necessary pneumatic tire is dispensed with entirely, the several different forms of resilient elements introduced into the structure, serving to give the tire sufficient resiliency, without resorting to the fragile and unsatisfactory pneumatic feature.

Sometimes the modified lug 50 of Fig. 9 is employed, to replace the lug 3 hereinbefore described, the lug 50 having an outstanding head 51, extended circumferentially of the wheel and adapted to engage the tire.

Having now described the invention, what is claimed is:—

1. A device of the class described comprising a wheel-encircling band provided with spaced outstanding lugs; a tire spaced from the band and having openings to receive the lugs; a plurality of removable bearing strips each of sufficient length to fit between adjacent lugs and held against movement circumferentially of the wheel; and springs secured to each strip transversely thereof and constituting a means for yieldingly supporting the tire.

2. A device of the class described comprising a wheel-encircling band provided with spaced outstanding lugs; a tire spaced from the band and having openings to receive the lugs; a plurality of removable bearing strips each of sufficient length to fit between adjacent lugs and held against movement circumferentially of the wheel; and springs secured in their intermediate portions to the strips, the ends of the springs constituting bearings for the yieldable support of the tire; the strips being thinned adjacent their edges to provide for a movement of the ends of the springs.

3. A device of the class described comprising a rim structure; a bearing strip spaced from the rim structure; a plurality of springs secured in their intermediate portions to the bearing strip; the bearing strip being thinned adjacent its edges to provide for a movement of the ends of the springs; a tire adapted to rest upon the ends of the springs; and adjustable means in the rim structure for adjusting the bearing strip and the springs with respect to the tire.

4. A device of the class described comprising a rim structure; side plates thereon; a tire located between the side plates; a bearing strip disposed between the sides; transverse springs secured to the strip to serve as a support for the tire; the adjacent faces of the plates having shoulders adapted to receive the ends of the springs; and a screw threaded into the rim structure, the screw being terminally provided with an enlargement mounted for rotation, but against withdrawal, in the bearing strip, whereby the screw constitutes a means for adjusting the strip.

In testimony that I claim the foregoing as my own, I have hereto affixed my signature in the presence of two witnesses.

DE FOREST L. GATES.

Witnesses:
W. H. HAZARD,
JOSEPHINE BEEMAN.